US 6,588,584 B2

(12) United States Patent
Craig et al.

(10) Patent No.: US 6,588,584 B2
(45) Date of Patent: Jul. 8, 2003

(54) CLAMP ASSEMBLY FOR CONVEYOR SIDEWALL

(75) Inventors: Richard L. Craig, Lisbon, OH (US); Jason R. Craig, Lisbon, OH (US); Charles W. Bell, Lisbon, OH (US)

(73) Assignee: R. L. Craig, Inc., Lisbon, OH (US)

( * ) Notice: Subject to any disclaimer, the term of this patent is extended or adjusted under 35 U.S.C. 154(b) by 6 days.

(21) Appl. No.: 09/835,682

(22) Filed: Apr. 16, 2001

(65) Prior Publication Data

US 2002/0148709 A1 Oct. 17, 2002

(51) Int. Cl.$^7$ .................. B65G 21/00; B65G 21/08; B65G 21/10; B65G 41/00; B65G 21/20
(52) U.S. Cl. .................. 198/860.1; 198/836.1; 198/837
(58) Field of Search .................. 198/860.1, 860.2, 198/836.1, 836.4, 837

(56) References Cited

U.S. PATENT DOCUMENTS

| 3,800,938 A | * | 4/1974 | Stone | 198/836.3 |
| 3,844,405 A | * | 10/1974 | Shuford | 198/836.3 |
| 5,137,145 A | * | 8/1992 | Clopton | 198/841 |
| 5,361,894 A | * | 11/1994 | Solcz | 198/790 |
| 5,657,854 A | * | 8/1997 | Chen et al. | 193/35 R |

* cited by examiner

Primary Examiner—Christopher P. Ellis
Assistant Examiner—Gene O Crawford
(74) Attorney, Agent, or Firm—Sand & Sebolt

(57) ABSTRACT

A clamping assembly for mounting an apparatus on a side rail of a conveyor has one or a pair of parallelepiped shaped blocks, each having a tenon extending outwardly from one planar side thereof. The tenon has a shape similar to one-half of a dovetail shaped groove, one or two such grooves are formed in one of the side rails of a conveyor. A pair of fasteners clamp each of the blocks against the outer surface of the side rail with the tenons thereof extending into a respective dovetail groove and engaging one-half of the groove. The outer width of the tenon is less then the entrance opening of the dovetail groove enabling the tenon to be placed directly into the groove without being slid inwardly from an end opening.

21 Claims, 5 Drawing Sheets

CLAMP ASSEMBLY FOR CONVEYOR SIDEWALL

BACKGROUND OF THE INVENTION

Technical Field

The invention relates to conveyors for moving articles along a predetermined path on a moving element, and in particular to a clamp assembly for mounting an apparatus adjacent to the moving conveyor. More particularly, the invention relates to a clamp assembly easily mounted on the sidewall of the conveyor frame for supporting an apparatus above the moving conveyor.

Background Information

Various types of conveyors are used in many industries for conveying numerous articles and products along a given path on a moving belt, chain, bucket, container, or other type of mechanism which supports and moves the articles and products along the desired path. Many of these conveyors will have various types of apparatus suspended above the conveyors such as labelers, printers, spray nozzles, quality control detection devices, or other devices for acting on or viewing the material being conveyed. These apparatuses are usually supported on brackets which are attached to the outboard surface of a conveyor sidewall of the supporting frame.

One common type of support bracket is a mounting block having a dovetail shaped tenon extending outwardly therefrom which is slidably received in a complementary shaped dovetail groove or grooves extending along the sidewall or attached side plate of the conveyor. Although these dovetail connections work satisfactory for supporting the apparatus, they must be installed from the end of the grooved sidewall or plate in order for the blocks to be slid along the dovetail groove to a desired location. Thus depending upon the length of the dovetail groove and number of apparatus support clamps, this requires considerable work for changing one of the clamps for maintenance reasons or adding or subtracting clamps thereon for supporting more or different types of apparatus. Likewise, when one of the dovetail tenons is damaged or worn it requires removing all of the intervening clamps by sliding along the groove to the end for replacing the entire block containing the worn tenon.

Therefore, the need exists for an improved mounting block and clamp assembly for attachment to the sidewall of a conveyor for easily mounting apparatus adjacent to the moving articles on the conveyor.

SUMMARY OF THE INVENTION

The present invention provides a clamp assembly for a sidewall of a conveyor which includes one or two separate substantially similar blocks, each of which has a tenon extending outwardly from a clamping surface thereof, which tenon in cross section has a configuration complementary to one-half of a dovetail groove, which grooves are formed in the sidewall of the conveyor for receiving the one-half dovetail shaped tenons of the one of two blocks to provide the effect of a single dovetail tenon.

Another aspect of the invention enables the single or pair of support blocks to be installed in any desired position along the length of the conveyor sidewall without moving or adjusting any of the other existing apparatus support blocks thereon, thus reducing considerably the installation and removal time and expense, and which can be performed even during running of the conveyor.

A further aspect of the invention provides forming the block and half dove-shaped tenon, as an integral one piece member of lightweight aluminum wherein each of the pair of blocks is substantially similar or identical to each other. The blocks can be installed in pairs so that the tenons extend at opposite angles with respect to each other forming in essence a split dovetail, half the dovetail being mounted in each of the spaced dovetailed grooves in the sidewall of the conveyor. This reduces considerably the cost of making the blocks and enables the blocks to be interchangeable with each other, reducing inventory and the number of parts required for a conveyor installation.

Another feature of the invention is clamping the block against the sidewall of the conveyor either by a pair of set bolts which extend through threaded holes in the block or by clamp bolts which support the desired apparatus on the block and extend through threaded holes to clamp the block and supported apparatus on the sidewall of the conveyor.

Still another feature of invention is the ability to reverse the position of the block and tenon in the groove should one side of the tenon become worn. This enables the block to be used in an opposite position wherein the non-worn angled side of the one-half tenon is engaged with one of the angled sides of the dovetail groove thereby doubling or greatly extending the usable life of the mounting blocks.

Another advantage of the invention is that should one of the tenons of one of the blocks be completely worn on both sides of the tenon it requires replacing only one of the blocks of the pair of blocks thereby reducing maintenance and replacement costs.

BRIEF DESCRIPTION OF THE DRAWINGS

The preferred embodiment of the invention, illustrative of the best mode in which applicant contemplates applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
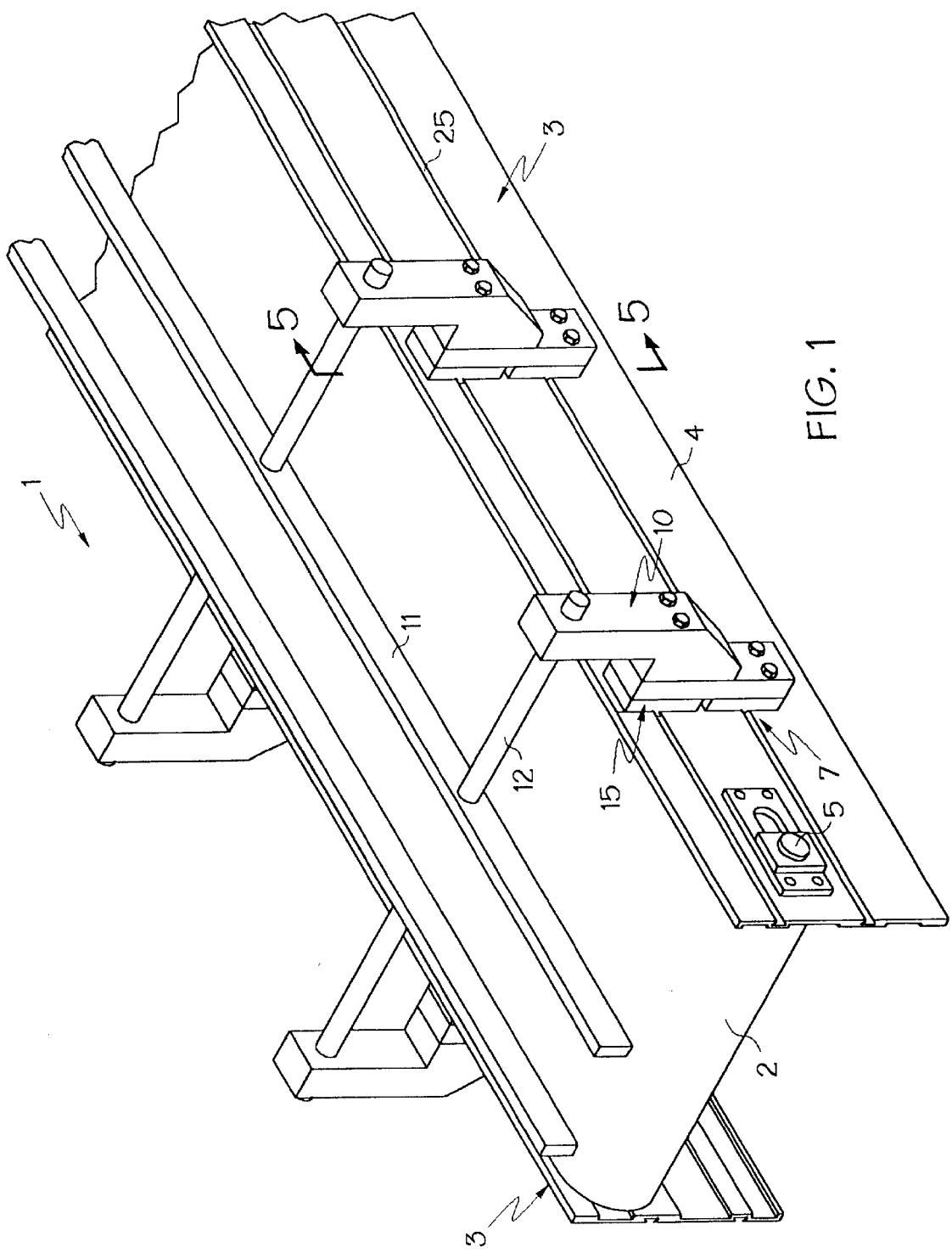
FIG. 1 is a perspective view of a conveyor having a pair of the improved clamp assemblies mounted on each sidewall of the conveyor and supporting apparatuses above the moving conveyor belt.
Figure 2:
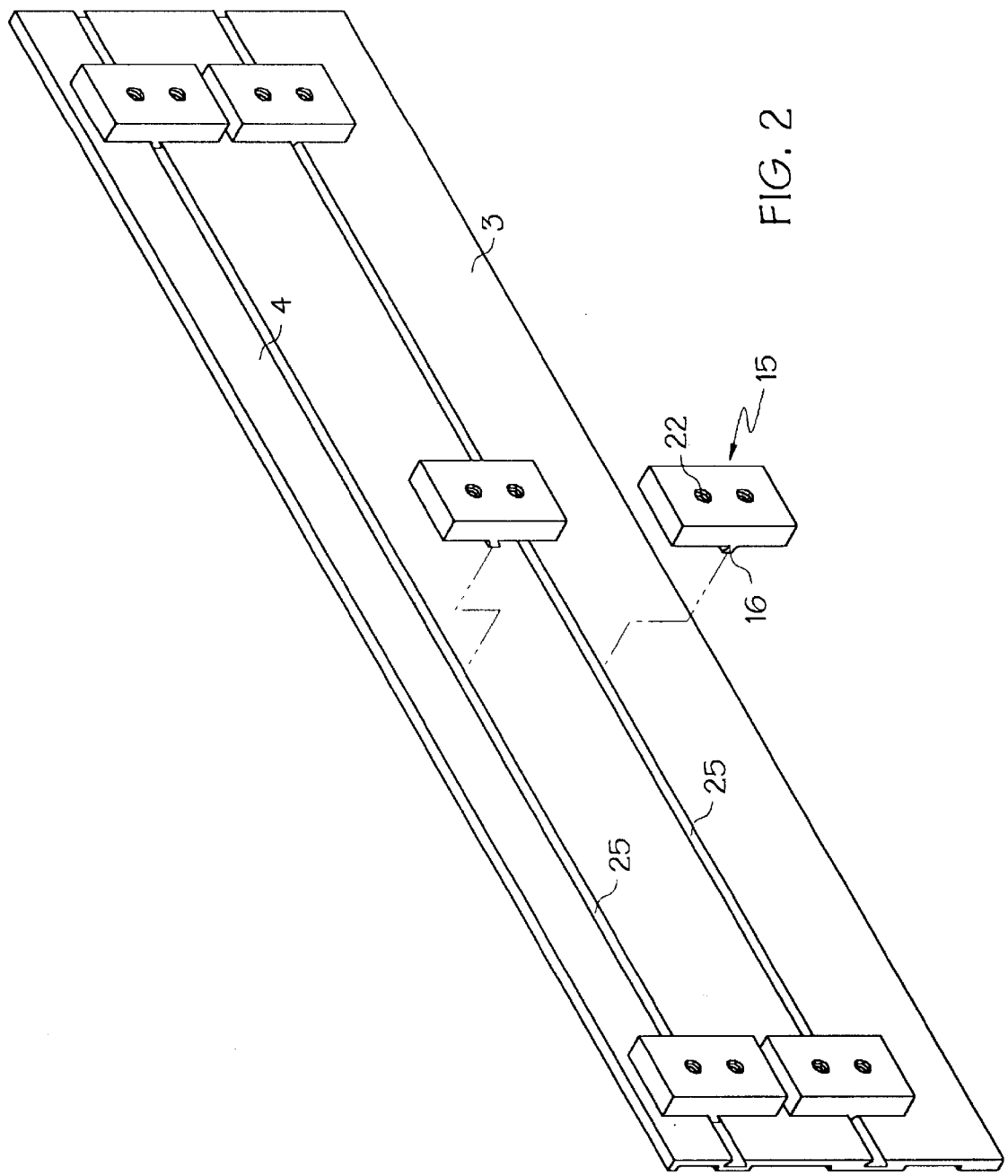
FIG. 2 is a perspective view of one of the sidewalls with two of the clamp assemblies mounted thereon and another of the clamp assemblies shown in an exploded position.

FIG. 1 shows a common type of conveyor indicated generally at 1, which consists of a power driven conveyor belt 2 movably mounted between a pair of side rails 3. Side rails 3 preferably are formed of aluminum, although they could be formed of other materials. A mounting assembly 5 is located at one end of the conveyor for moving the conveyor in a linear path between the side rails such as by a power driven roller (not shown).

In accordance with the invention, four of the improved clamp assemblies, each of which is indicated generally at 7, are mounted on side rails 3 and clamped against outer surface 4 of the side rails. Each assembly includes a mounting bracket 10 which supports a product scanning bar 11 on rods 12 over the moving conveyor. Mounting brackets 10, scanning bar 11 and rods 12 are for illustrative purposes only and clamp assembly 7 can support numerous types of apparatus such as sprayers, printers, label applicators, etc. which is mounted above a conveyor for performing work on or checking the various materials being moved therealong.

Each clamp assembly 7 includes a pair of blocks 15, each preferably having six flat sides forming a parallelepiped configuration and formed of lightweight aluminum. Each block 15 has a tenon 16 (FIGS. 3 and 4) preferably formed integrally with the block and extending generally across the midpoint and outwardly from a front surface 17 thereof, and in accordance with the invention has a half dovetail shaped configuration. Tenon 16 has a pair of generally parallel angled surfaces 18 and 19 which terminates in an outer flat surface 20 which extends generally parallel with front surface 17. A pair of internally threaded holes 22 are formed in each block 15 on opposite sides of tenon 16 for mounting the block on side rail 3 and for mounting apparatus support brackets 10 thereon as described below.

At least one side rail 3 will have one or a pair of spaced parallel dovetail grooves 25 formed therein and extending generally horizontally throughout the length of the side rail. Each groove 25 is formed with an entrance opening 26 and a pair of angled walls 27 diverging outwardly from opening 26 and terminating in a flat bottom wall 28 (FIG. 3).

Figure 3:
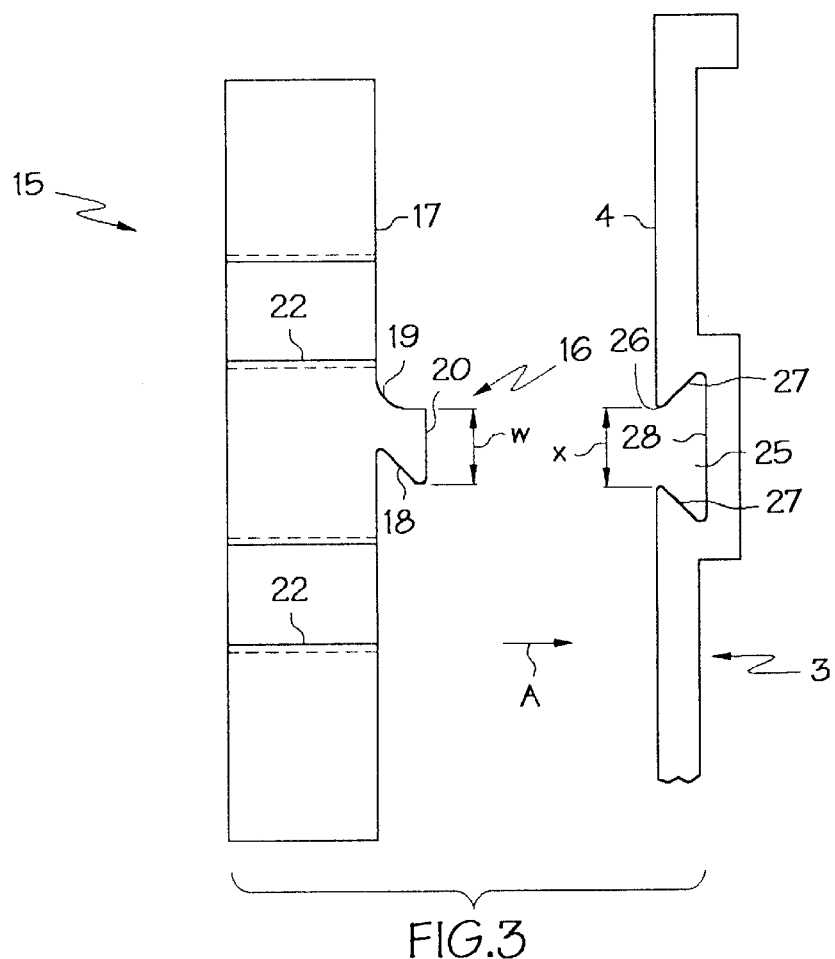
FIG. 3 is an enlarged side elevation of one of the blocks and associated sidewall dovetail groove.
Figure 4:
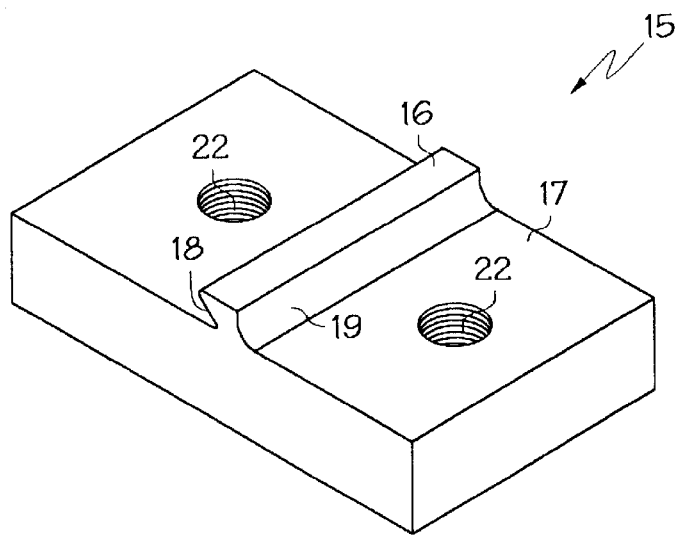
FIG. 4 is an enlarged perspective view of the block.

As shown in FIG. 3 block 15 is easily mounted at any desired location along groove 25 due to the one-half dovetail configuration of tenon 16. The width W of outer surface 20 is slightly less than the width X of dovetail opening 26 which enables block 15 to be mounted in groove 25 by inserting tenon 16 directly into the groove through opening 26 in a substantially perpendicular direction as shown by arrow A in FIG. 3. This avoids the heretofore requirement of slidably inserting a full dovetail shaped tenon into the dovetail groove at the end of the side rail and sliding it linearly therealong to the desired location requiring all of the intervening mounting blocks to be removed or readjusted. This also enables an individual block 15 to be removed and replaced if needed for maintenance without disturbing any of the other mounting blocks and supported apparatus.

Figure 5:
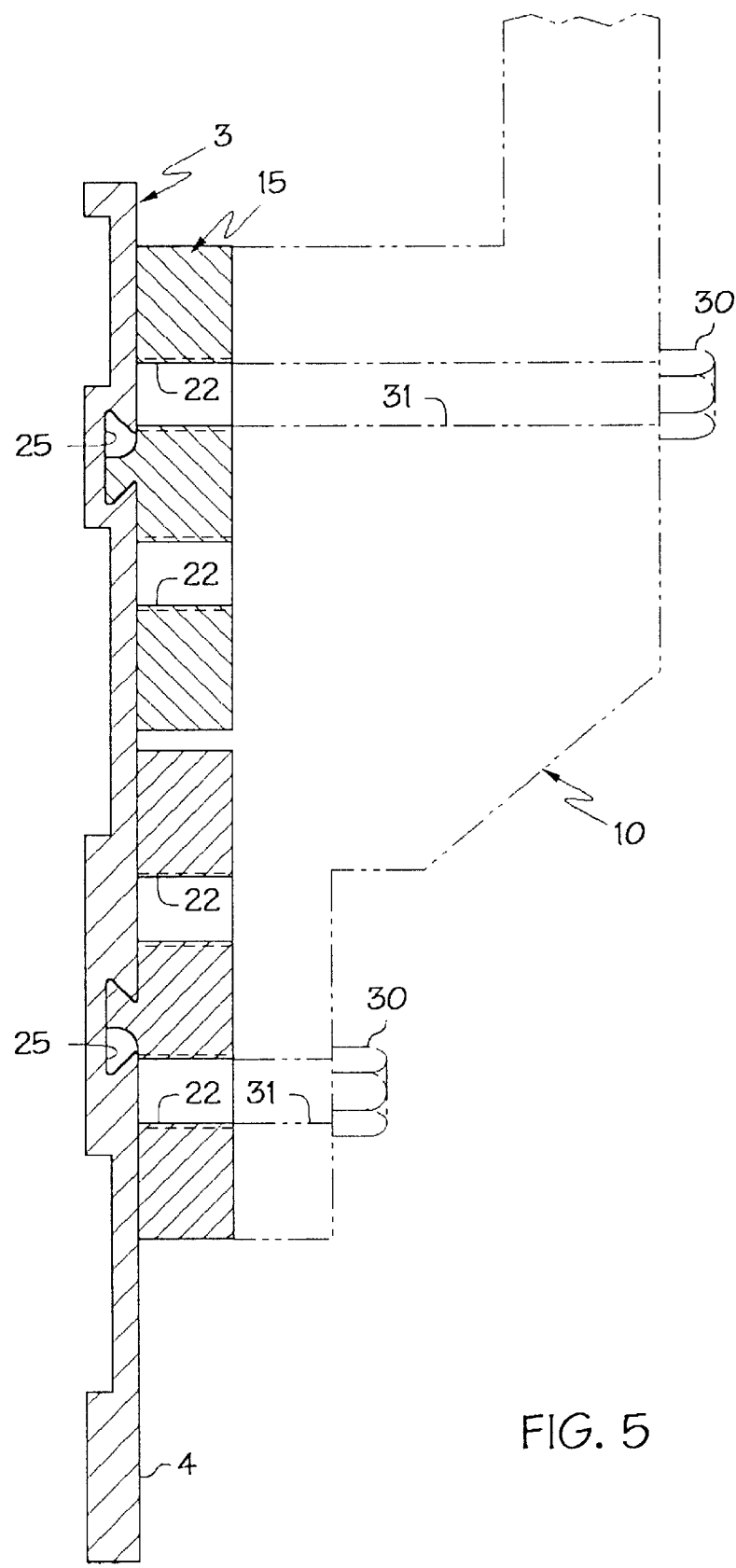
FIG. 5 is an enlarged sectional view taken along line 5—5, FIG. 1 showing two of the blocks mounting an apparatus which is shown in dot dash lines, on the sidewall of the conveyor.
Figure 6:
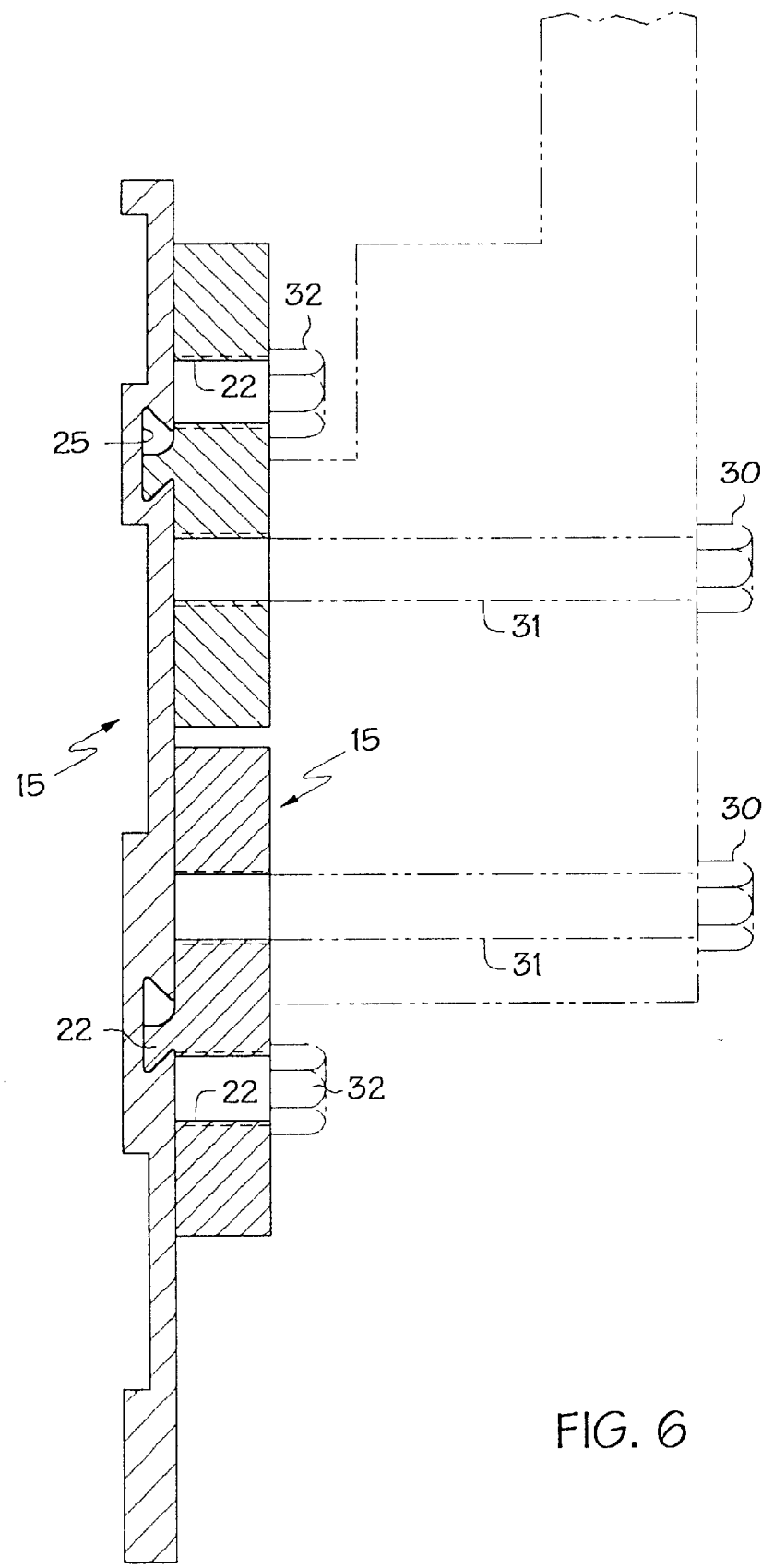
FIG. 6 is a sectional view similar to FIG. 5 showing a modified arrangement for mounting the apparatus by a pair of the blocks on the sidewall of the conveyor.

After tenon 16 is inserted into a selected dovetail groove 25, the complementary shaped angled surface 18 will rest upon one of the angled walls 27 and outer surface 20 will abut bottom wall 28 of groove 25. If desired, another block 15 is mounted on side rail 3 by inserting tenon 16 through dovetailed opening 26 in vertical alignment with the previously mounted block 15. However, tenon 16 of this second block will extend in the opposite direction to that of the adjacent tenon as shown in FIGS. 5 and 6. This effectively forms a complete dovetail configuration in combination with the other tenon 16. Half of the dovetail-shaped tenon is located within one of the dovetail grooves 25 and the other tenon is located in the other dovetail groove. Again, each block 15 is placed in the desired location along rail 3 by inserting tenon 16 easily into groove 25 by moving it directly or perpendicularly toward side rail surface 4.

For certain applications, only one block 15 is required as shown in FIG. 3 in which surface 18 will engage and be supported on angled wall 27 of groove 25. For other applications, such as for heavier apparatus, a pair of blocks 15 will be used as shown in FIGS. 5 and 6, in which installations the angled surfaces 18 and 19 of tenons 16 can engage angled walls 27 of groove 25 in various combinations.

Bracket 10 is mounted on the pair of blocks 15 in various manners, two of which are shown in FIGS. 5 and 6. As shown in FIG. 5, bracket 10 is mounted on adjacent blocks 15 by a pair of clamping bolts 30 which extends through openings 31 formed in mounting bracket 10 and into threaded engagement with holes 22 in blocks 15. Clamping bolts 30 also function as set bolts and press against side surface 4 of side rail 3 to clamp blocks 15 in a fixed position on the side rail as well as to mount brackets 10 thereon. FIG. 6 shows another type of mounting arrangement wherein a separate pair of stud bolts 32 clamp blocks 15 in their desired adjusted position against side rail 3 by extending through holes 22. Mounting bracket 10 then is secured on blocks 15 by clamp bolts 30 which extend only partially into holes 22 of each block 15. This enables mounting bracket 10 to be attached and removed from blocks 15 without disturbing the mounting of the blocks on side rail 3 since each block has its own attachment bolt 32.

When a single block 15 is used (FIG. 3) a pair of bolts (not shown) will extend through the apparatus and through block holes 22 to both mount the apparatus on block 15 and to clamp block 15 against side rail 3.

Should an angled surface of tenon 16 or angled wall of groove 25 become damaged, block 15 is merely reversed providing an undamaged tenon surface engaging the corresponding angled wall shown by lower block 15 in FIGS. 5 and 6. This effectively doubles the life of blocks 15.

Accordingly, the improved clamp assembly for mounting apparatus on a conveyor sidewall is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the clamp assembly for a conveyor sidewall is constructed and used, the characteristics of the construction, and the advantageous new and useful results obtained; the new and useful structures, devices, elements, arrangements, parts, and combinations are set forth in the appended claims.

What is claimed:

1. A conveyor comprising:
   first and second side rails, said first rail has a pair of dovetail grooves formed therein and extending along a surface of said first rail;
   a conveyor element movably mounted between said first and second rails; and
   a clamping assembly mounted on said first rail for supporting an apparatus adjacent said conveyor element, said clamping assembly including first and second blocks, each block having an angled tenon extending outwardly thereon, each of said tenons being received in a respective one of the dovetail grooves and extending at generally opposite angles with respect to each other when mounted in said grooves; and fasteners for securing the blocks on said first rail.

2. The conveyor defined in claim 1 wherein the two angled tenons in cross section from a fan shaped tenon complementary to the dovetail grooves.

3. The conveyor defined in claim 1 wherein the dovetail grooves extend in a parallel relationship along said surface of the first rail; and wherein said surface is the outboard surface of said first rail.

4. The conveyor defined in claim 1 wherein each of the blocks have a rectangular parallelepiped shape with six generally smooth surfaces; and in which the angled tenon extends outwardly generally adjacent the midpoint of one of said surfaces.

5. The conveyor defined in claim 1 wherein the side rails and first and second blocks are formed of aluminum.

6. The conveyor defined in claim 1 wherein the conveyor element is a power driven conveyor belt.

7. The conveyor defined in claim 1 wherein each of said blocks includes a first internally threaded hole; and in which the fastener is a set bolt engaged in said hole for securing said block against the first rail.

8. The conveyor defined in claim 7 wherein each of said blocks further include a second internally threaded hole; and in which a clamp bolt is engaged in said second hole for securing the apparatus on the blocks.

9. The conveyor defined in claim 1 wherein each of the dovetail grooves in cross section has a pair of angled sidewalls terminating in an outer opening; and in which each of the tenons in cross section has a pair of angled sides and an outer free end with said free end being insertable into said dovetail groove through said outer opening.

10. The conveyor defined in claim 9 wherein one of the sides of each of the tenons in cross section is complementary in size and angle to the angled sidewalls of the dovetail grooves.

11. The conveyor defined in claim 10 wherein the angled sidewalls of each of the dovetail grooves are complementary to each other; and in which each of the angled sides of the tenon is selectively engageable with each of said angled sidewalls of the dovetail grooves.

12. A clamping assembly for mounting an apparatus on a side frame of a conveyor comprising:
    a plate having a surface and at least one groove extending along said surface, said groove having a pair of angled walls terminating in an entrance opening, said plate being adapted to be mounted on the side frame of the conveyor;
    a block having a clamping surface engageable with the surface of the plate and having a tenon extending outwardly from said clamping surface and insertable into the entrance opening of of the groove, and having an angled surface complementary to and engageable with one of the angled walls of the groove; and
    a clamping device for mounting the apparatus on the block and for clamping the clamping surface of the block against the surface of the plate to adjustably mount the apparatus on the block and the block in a selected position on the plate.

13. The clamping assembly defined in claim 12 wherein the block has a pair of apertures, at least one of which receive a fastener for clamping the block against the plate and at least the other of said apertures receives a fastener for mounting the apparatus on said block.

14. The clamping assembly defined in claim 12 wherein the groove has a dovetail cross section formed with opposed converging sidewalls, each sidewall being compatible with the angled surface of the tenon for selectable clamping engagement therewith.

15. The clamping assembly defined in claim 12 wherein the tenon and block are formed as an integral one piece member.

16. The clamping assembly defined in claim 12 wherein the tenon has a pair of angled surfaces generally parallel to each other and terminating in an outer surface; in which the entrance opening of the groove has a width X and the outer surface of the block has a width W; and in which width X is slightly greater than width W.

17. A conveyor comprising:
    first and second side rails, said first rail having at least one dovetail groove formed therein and extending along a surface of said first rail, said groove having a pair of generally oppositely angled side walls;
    a conveyor element movably mounted between said first and second rails;
    a clamping assembly mounted on said first rail for supporting an apparatus adjacent said conveyor element, said clamping assembly including a t least one block having a tenon extending outwardly thereon, s aid tenon having a pair of angled generally parallel side surfaces received in the dovetail groove with one of the angled surfaces of the tenon engaging one of the angled side walls of the groove; and
    fasteners for securing the block on said first rail.

18. The conveyor defined in claim 17 wherein the two angled side surfaces of the tenon in cross section form a fan shaped tenon complementary to the dovetail groove.

19. The conveyor defined in claim 17 wherein the block has a rectangular parallelepiped shape with six generally smooth surfaces; and in which the angled tenon extends outwardly from the midpoint of one of said surfaces.

20. The clamping assembly defined in claim 17 wherein the tenon and block are formed as an integral one piece member.

21. A clamping assembly for mounting an apparatus on a conveyor comprising:
    a plate having a surface and a pair of spaced paralleled grooves extending along said surface, each of said grooves having a dovetail cross section formed by a pair of angled walls terminating in an entrance opening, said plate being adapted to be mounted on the conveyor;
    a block for supporting the apparatus, said block having a clamping surface engageable with the surface of the plate and having a tenon extending outwardly from said clamping surface and insertable into the entrance opening of the groove, said tenon in cross section being complementary to one-half of said dovetail cross section and having an angled surface complementary to and engageable with one of the angled walls of the groove; and
    a clamping device for clamping the clamping surface of the block against the surface of the plate to adjustably mount the block in a selected position on the plate.

* * * * *